(12) United States Patent
Hsieh et al.

(10) Patent No.: US 10,964,280 B2
(45) Date of Patent: Mar. 30, 2021

(54) SOURCE DRIVER

(71) Applicant: Novatek Microelectronics Corp., Hsinchu (TW)

(72) Inventors: Cheng-Tsu Hsieh, Taoyuan (TW); Ching-Wen Hou, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 16/290,967

(22) Filed: Mar. 4, 2019

(65) Prior Publication Data

US 2020/0286438 A1    Sep. 10, 2020

(51) Int. Cl.
*G09G 3/36* (2006.01)
*G02F 1/133* (2006.01)

(52) U.S. Cl.
CPC ....... *G09G 3/3674* (2013.01); *G02F 1/13306* (2013.01)

(58) Field of Classification Search
CPC .......................................... G09G 3/3685–3692
See application file for complete search history.

(56) References Cited

U.S. PATENT DOCUMENTS

| | | | | |
|---|---|---|---|---|
| 2007/0052642 A1* | 3/2007 | Jang | ..................... | G09G 3/3688 345/89 |
| 2010/0220084 A1* | 9/2010 | Chiang | ................ | G09G 3/3685 345/211 |
| 2010/0220095 A1* | 9/2010 | Chiu | ..................... | G09G 3/3688 345/214 |
| 2014/0078129 A1* | 3/2014 | Hong | ................... | G09G 3/3688 345/212 |

\* cited by examiner

*Primary Examiner* — Hang Lin
(74) *Attorney, Agent, or Firm* — JCIPRNET (57) ABSTRACT

A source driver including a first output buffer, a second output buffer and a plurality of switches is provided. The first output buffer is connected to an output line. The second output buffer is connected to another output line. During a charge-sharing period, the first switch and the fourth switch are not conducted, and the second switch, the third switch, the fifth switch and the sixth switch are conducted. A first node, a second node and the output lines are connected together to perform a charge-sharing operation during the charge-sharing period. Based on the circuit structure of the source driver, the efficiency of the charge-sharing operation is improved and the chip area of the source driver is reduced.

7 Claims, 8 Drawing Sheets

SOURCE DRIVER

BACKGROUND

Technical Field

The disclosure relates to a display driver, and more specifically, relates to a source driver.

Description of Related Art

Driving methods for liquid crystal display (LCD) panels mostly use one or more gate drivers to sequentially generate a plurality of scan signals to scan lines in the LCD panel and thus turn on pixels. Source drivers are used to coordinate with the generation of each scan signal to correspondingly generate a plurality of data signals to a plurality of data lines in the LCD panel and thus performing the pixel writing operations.

A pre-charge operation is generally designed in a source driver to increase a display quality of the LCD panel. During a pre-charge period, a pre-charge voltage is outputted to a pixel before the source driver provides a gray level voltage according to a display data corresponding to the pixel, so that the pixel be pre-charged before being driven and a response time and a current consumption for the pixel are reduced. In addition, in order to reduce a power consumption of the source driver, a charge-sharing operation is applied in transmitting the pixel voltage to the liquid crystal display panel. However, with continuous advancements of display technologies, driving methods for the source driver are also advanced, so that the charge-sharing operation is not efficient, and the chip area of the source driver is large.

In order to further improve the efficiency of the charge-sharing operation and reduce the chip area of the source driver, a novel source driver is required to be proposed.

SUMMARY

The disclosure is directed to a source driver, which provides an efficient charge-sharing operation and has small chip area.

A source driver of the disclosure includes a first output buffer, a first switch, a second switch, a third switch, a second output buffer, a fourth switch, a fifth switch and a sixth switch. The first output buffer includes a first input terminal, a second input terminal and an output terminal. The first switch includes a first terminal, a second terminal and a control terminal. The first terminal of the first switch is coupled to the output terminal of the first output buffer. The control terminal of the first switch is controlled by a first control signal. The second switch includes a first terminal, a second terminal and a control terminal. The first terminal of the second switch is coupled to a first node. The second terminal of the second switch is coupled to the second terminal of the first switch. The control terminal of the second switch is controlled by a second control signal. The third switch includes a first terminal, a second terminal and a control terminal. The first terminal of the third switch is coupled to the second terminal of the first switch and the second terminal of the second switch. The second terminal of the third switch is coupled to a second node. The control terminal of the third switch is controlled by a third control signal. The second output buffer includes a first input terminal, a second input terminal and an output terminal. The fourth switch includes a first terminal, a second terminal and a control terminal. The first terminal of the fourth switch is coupled to the output terminal of the second output buffer. The fifth switch includes a first terminal, a second terminal and a control terminal. The first terminal of the fifth switch is coupled to the first node. The second terminal of the fifth switch is coupled to the second terminal of the fourth switch. The sixth switch includes a first terminal, a second terminal and a control terminal. The first terminal of the sixth switch is coupled to the second terminal of the fourth switch and the second terminal of the fifth switch. The second terminal of the sixth switch is coupled to the second node.

In an embodiment of the disclosure, the first node and the second node are floating.

In an embodiment of the disclosure, the first node is coupled to a first capacitor. The second node is coupled to a second capacitor. The second capacitor has a first terminal and a second terminal.

In an embodiment of the disclosure, the source driver further includes a seventh switch and an eighth switch. The seventh switch includes a first terminal, a second terminal and a control terminal. The second terminal of the seventh switch is coupled to the second node and the second terminal of the third switch. The eighth switch includes a first terminal, a second terminal and a control terminal. The second terminal of the eighth switch is coupled to the first node and the first terminal of the fifth switch.

In an embodiment of the disclosure, the source driver further includes a ninth switch and a tenth switch. The ninth switch includes a first terminal, a second terminal and a control terminal. The first terminal of the ninth switch is coupled to a first external voltage. The second terminal of the ninth switch is coupled to the second node and the second terminal of the third switch. The tenth switch includes a first terminal, a second terminal and a control terminal. The first terminal of the tenth switch is coupled to a second external voltage. The second terminal of the tenth switch is coupled to the first node and the first terminal of the fifth switch.

In an embodiment of the disclosure, the source driver further includes an eleventh switch and a twelfth switch. The eleventh switch includes a first terminal, a second terminal and a control terminal. The first terminal of the eleventh switch is coupled to a first reference voltage. The second terminal of the eleventh switch is coupled to the second node and the second terminal of the third switch. The twelfth switch includes a first terminal, a second terminal and a control terminal. The first terminal of the twelfth switch is coupled to a second reference voltage. The second terminal of the twelfth switch is coupled to the first node and the first terminal of the fifth switch.

In an embodiment of the disclosure, the source driver further includes a first power rail and a second power rail. The first power rail is connected to the first node, and the second power rail is connected to the second node.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
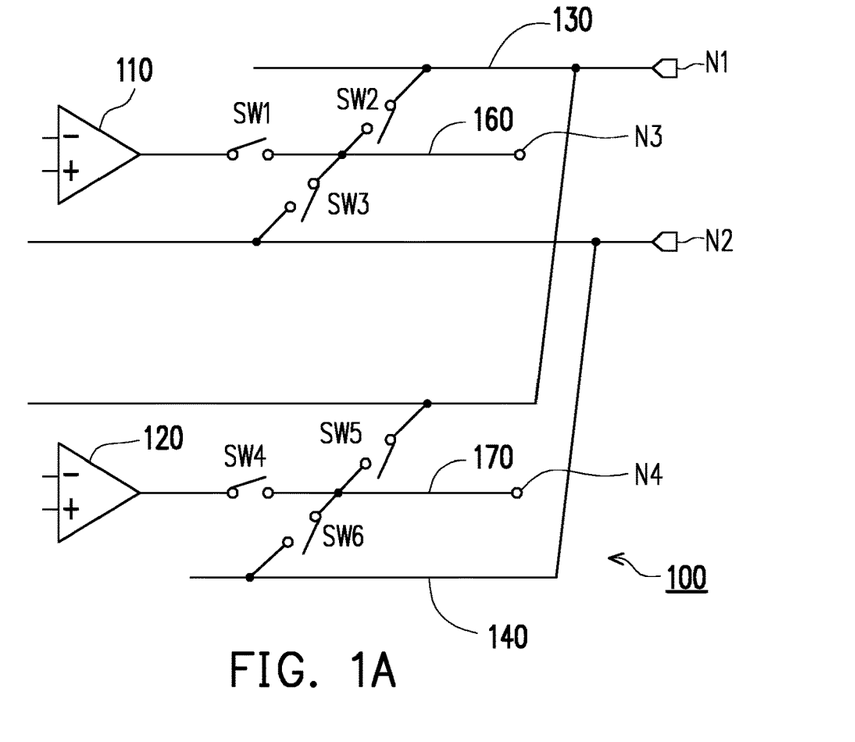
FIG. 1A is a schematic diagram illustrating a source driver according to an embodiment of the invention.
Figure 1B:
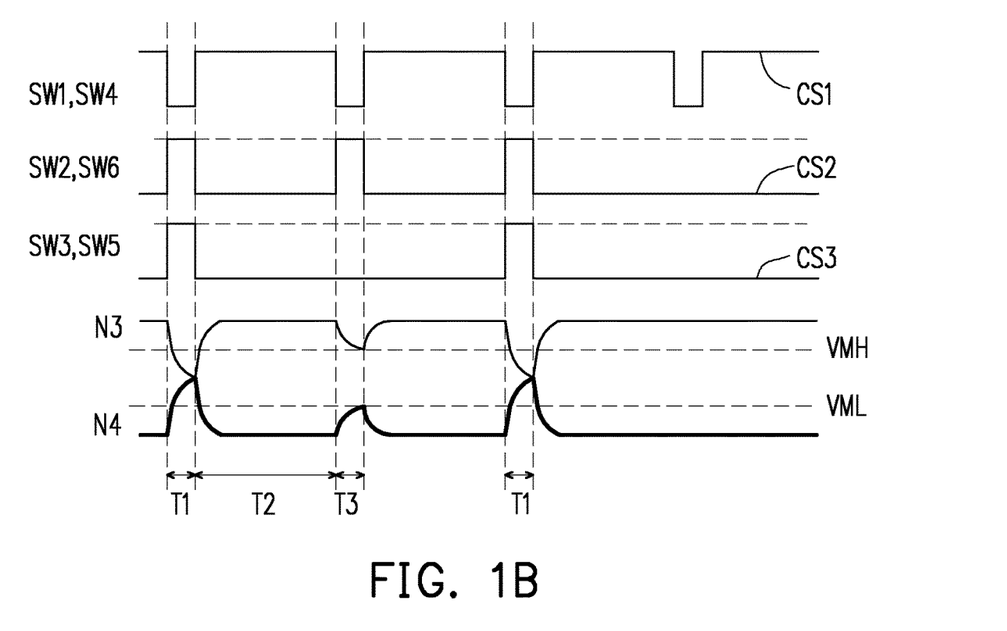
FIG. 1B is a waveform diagram illustrating control signals and driving voltages of the source driver depicted in FIG. 1A.

FIG. 1A is a schematic diagram illustrating a source driver according to an embodiment of the invention. FIG. 1B is a waveform diagram illustrating control signals and driving voltages of the source driver depicted in FIG. 1A. Referring to FIG. 1A and FIG. 1B, the source driver 100 of the present embodiment includes a first power rail 130, a second power rail 140, a first output buffer 110, a first switch SW1, a second switch SW2, a third switch SW3, a second output buffer 120, a fourth switch SW4, a fifth switch SW5 and a sixth switch SW6.

The first power rail 130 is connected to a first node N1, and the second power rail 140 is connected to a second node N2. In the present embodiment, the first node N1 and the second node N2 may be floating pads but can be pre-charged to a voltage VML or VMH when a pre-charge operation is performed.

The first terminal of the first switch SW1 is coupled to the output terminal of the first output buffer 110. The second terminal of the first switch SW1 is coupled to the second terminal of the second switch SW2. The control terminal of the first switch SW1 is controlled by a first control signal CS1. The first switch SW1 is configured to control the output of the first output buffer 110. In the present embodiment, the first output buffer 110 may be located in an odd driving channel of the source driver 100 for driving a display panel (not shown). The first output buffer 110 outputs driving voltages via an output node N3 when the first switch SW1 is conducted.

The first terminal of the second switch SW2 is coupled to the first power rail 130. The second terminal of the second switch SW2 is coupled to the second terminal of the first switch SW1. The control terminal of the second switch SW2 is controlled by a second control signal CS2. In the present embodiment, the second switch SW2 is conducted to pre-charge the voltage at the output node N3 to the voltage VMH when the pre-charge operation is performed. The first terminal of the third switch SW3 is coupled to the second terminal of the first switch SW1 and the second terminal of the second switch SW2. The second terminal of the third switch SW3 is coupled to the second power rail 140. The control terminal of the third switch SW3 is controlled by a third control signal CS3.

The first terminal of the fourth switch SW4 is coupled to the output terminal of the second output buffer 120. The second terminal of the fourth switch SW4 is coupled to the second terminal of the fifth switch SW5. The control terminal of the fourth switch SW4 is controlled by the first control signal CS1. The fourth switch SW4 is configured to control the output of the second output buffer 120. In the present embodiment, the second output buffer 120 may be located in an even driving channel of the source driver 100 for driving the display panel. The second output buffer 120 outputs driving voltages via an output node N4 when the fourth switch SW4 is conducted.

The first terminal of the fifth switch SW5 is coupled to the first power rail 130. The second terminal of the fifth switch SW5 is coupled to the second terminal of the fourth switch SW4. The control terminal of the fifth switch SW5 is controlled by the second control signal CS2. The first terminal of the sixth switch SW6 is coupled to the second terminal of the fourth switch SW4 and the second terminal of the fifth switch SW5. The second terminal of the sixth switch SW6 is coupled to the second power rail 140. The control terminal of the sixth switch SW6 is controlled by the third control signal CS3. In the present embodiment, the sixth switch SW6 is conducted to pre-charge the voltage at the output node N4 to the voltage VML when the pre-charge operation is performed.

During a charge-sharing period T1, the first switch SW1 and the fourth switch SW4 are not conducted, and the second switch SW2, the third switch SW3, the fifth switch SW5 and the sixth switch SW6 are conducted. The first power rail 130, the second power rail 140 and the output lines 160 and 170 are connected together to perform a charge-sharing operation during the charge-sharing period T1.

During a driving period T2, the first switch SW1 and the fourth switch SW4 are conducted, and the second switch SW2, the third switch SW3, the fifth switch SW5 and the sixth switch SW6 are not conducted. The first output buffer 110 and the second output buffer 120 respectively output the driving voltages to drive the display panel during the driving period T2.

During a pre-charge period T3, the second switch SW2 and the sixth switch SW6 are conducted, and the first switch SW1, the third switch SW3, the fourth switch SW4 and the fifth switch SW5 are not conducted. The voltages at the output nodes N3 and N4 are respectively pre-charged to the voltage VMH and VML during the pre-charge period T3.

Figure 2:
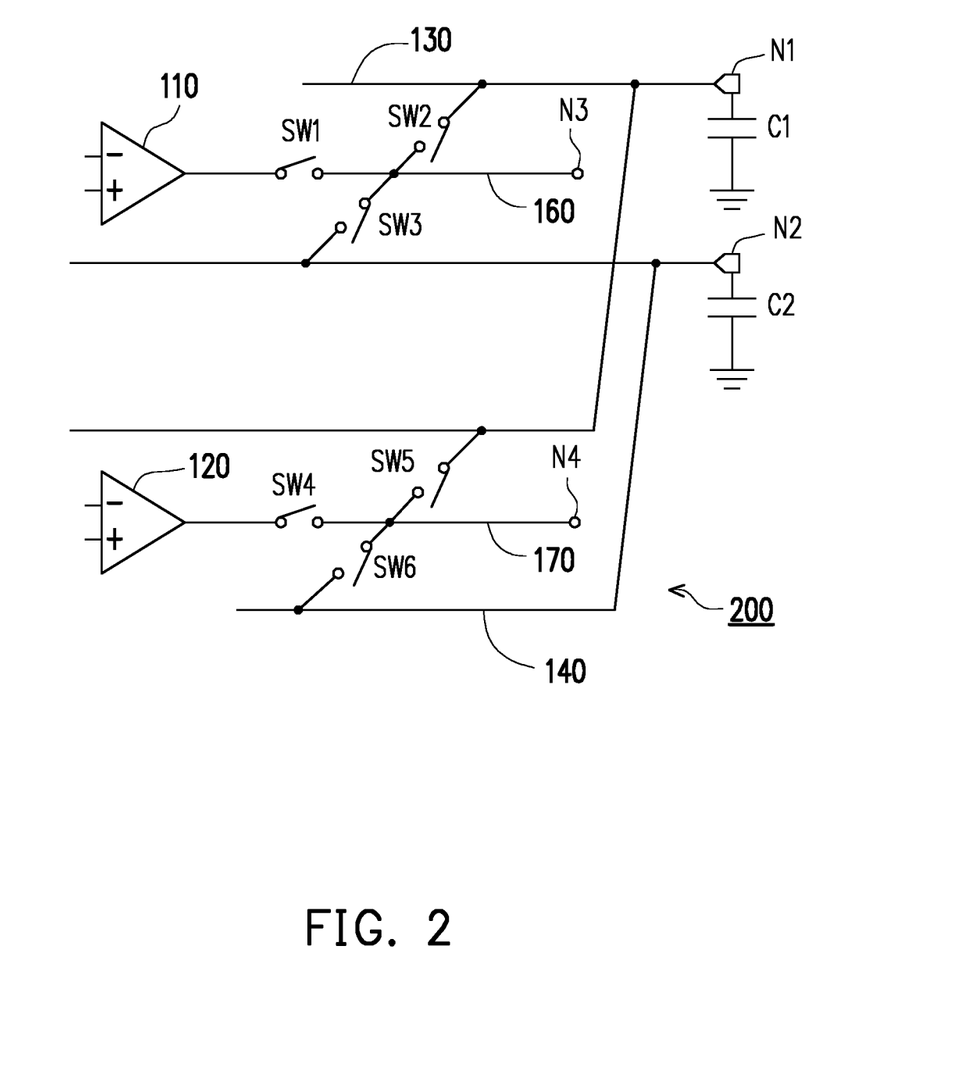
FIG. 2 is a schematic diagram illustrating a source driver according to another embodiment of the invention.

FIG. 2 is a schematic diagram illustrating a source driver according to another embodiment of the invention. Referring to FIG. 1A and FIG. 2, the source driver 200 of the present embodiment is similar to that depicted in FIG. 1A, and the main difference therebetween lies in that the first node is coupled to a first capacitor C1 and the second node is coupled to a second capacitor C2. The first terminal of the first capacitor C1 is coupled to the first node N1, and the second terminal of the first capacitor C1 is grounded. The first terminal of the second capacitor C2 is coupled to the second node N2, and the second terminal of the second capacitor C2 is grounded.

Figure 3A:
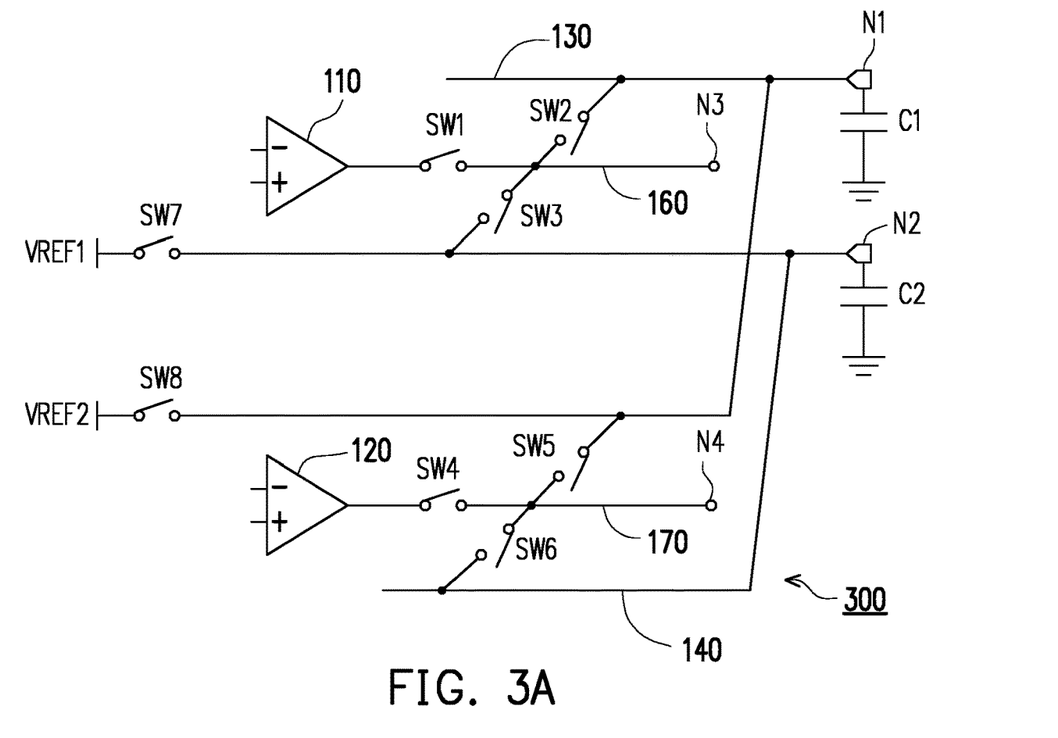
FIG. 3A is a schematic diagram illustrating a source driver according to another embodiment of the invention.
Figure 3B:
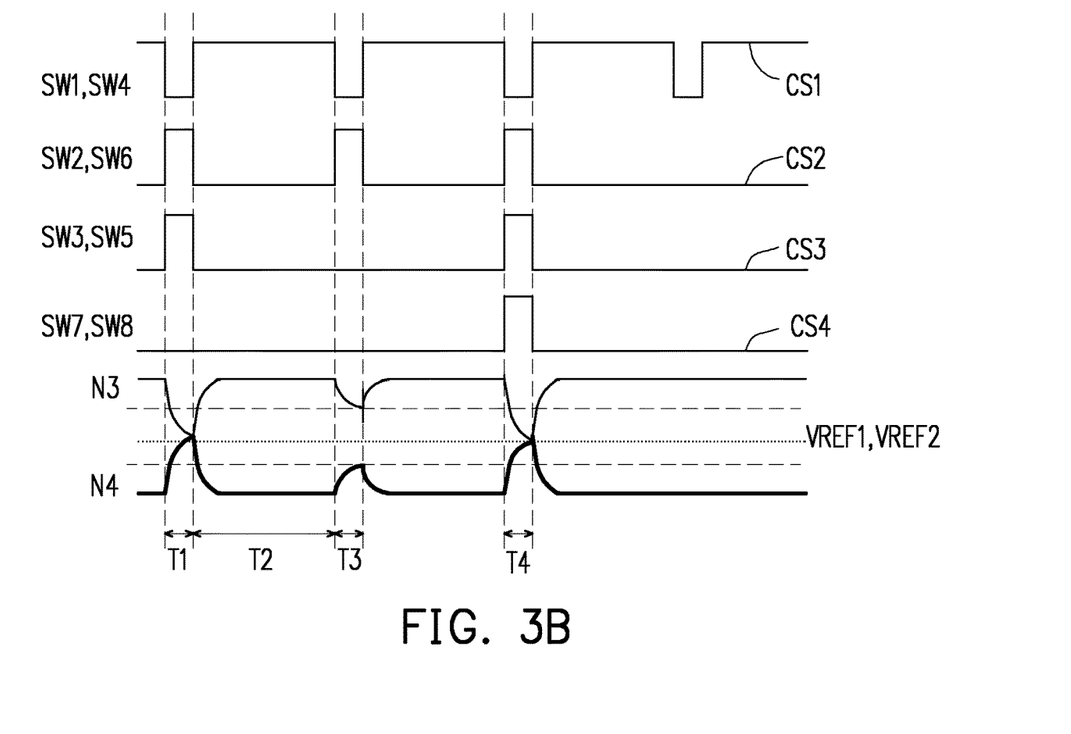
FIG. 3B is a waveform diagram illustrating control signals and driving voltages of the source driver depicted in FIG. 3A.

FIG. 3A is a schematic diagram illustrating a source driver according to another embodiment of the invention. FIG. 3B is a waveform diagram illustrating control signals and driving voltages of the source driver depicted in FIG. 3A. Referring to FIG. 2, FIG. 3A and FIG. 3B, the source driver 300 of the present embodiment is similar to that depicted in FIG. 2, and the main difference therebetween lies in that the source driver 300 further includes a seventh switch SW7 and an eighth switch SW8.

To be specific, the first terminal of the seventh switch SW7 is coupled to a first reference voltage VREF1, the second terminal of the seventh switch SW7 is coupled to the second power rail 140 and the second terminal of the third switch SW3, and the control terminal of the seventh switch SW7 is controlled by a fourth control signal CS4. The first terminal of the eighth switch SW8 is coupled to a second reference voltage VREF2, the second terminal of the eighth switch SW8 is coupled to the first power rail 130 and the first terminal of the fifth switch SW5, and the control terminal of the eighth switch SW8 is controlled by the fourth control signal CS4.

In the present embodiment, a voltage value of the first reference voltage VREF1 is the same as that of the second reference voltage VREF2. The voltage values of the first reference voltage VREF1 and the second reference voltage VREF2 are larger than 0V and smaller than or equal to a system voltage, e.g. a half of the system voltage. In an embodiment, the voltage values of the first reference voltage VREF1 and the second reference voltage VREF2 may be different. During a period T4, the first switch SW1 and the fourth switch SW4 are not conducted, and the second switch SW2, the third switch SW3, the fifth switch SW5, the sixth switch SW6, the seventh switch SW7 and the eighth switch SW8 are conducted. The voltages at the output nodes N3 and N4 are charged to the first reference voltage VREF1 and the second reference voltage VREF2 during the period T4.

Figure 4A:
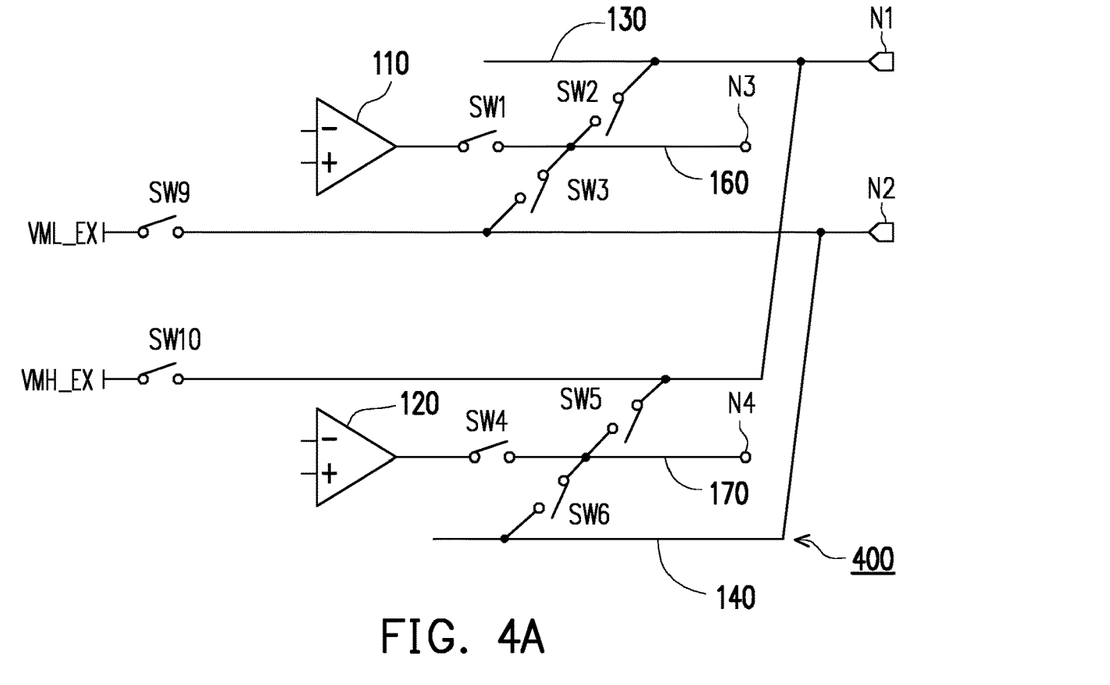
FIG. 4A is a schematic diagram illustrating a source driver according to another embodiment of the invention.
Figure 4B:
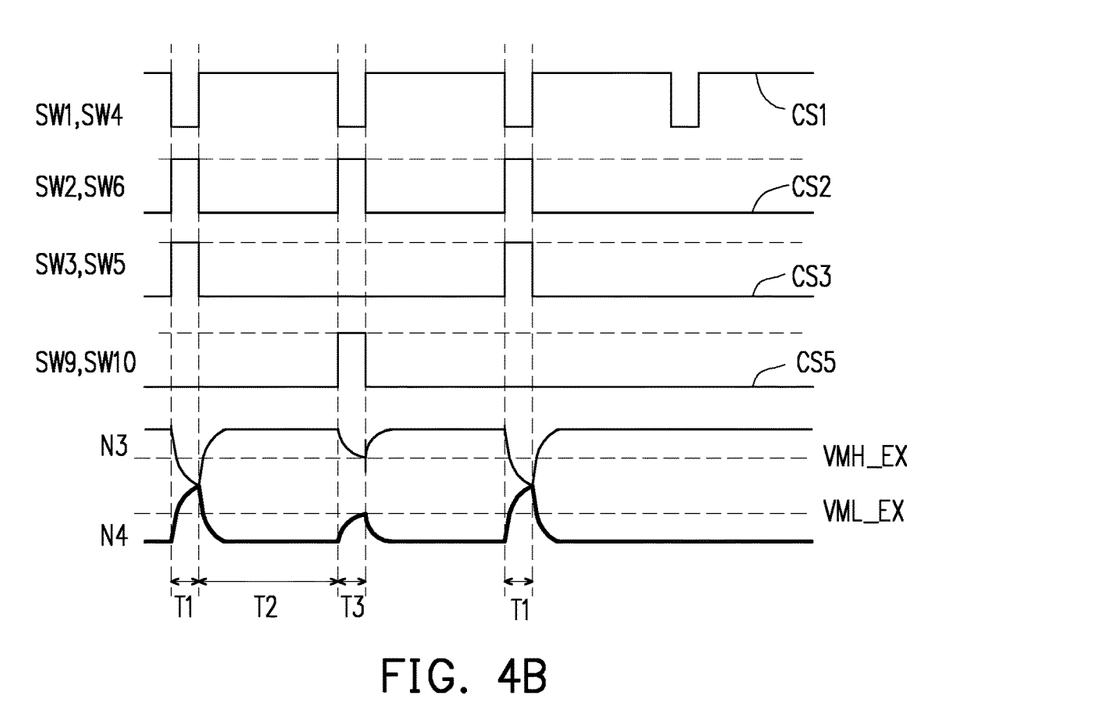
FIG. 4B is a waveform diagram illustrating control signals and driving voltages of the source driver depicted in FIG. 4A.

FIG. 4A is a schematic diagram illustrating a source driver according to another embodiment of the invention. FIG. 4B is a waveform diagram illustrating control signals and driving voltages of the source driver depicted in FIG. 4A. Referring to FIG. 1, FIG. 4A and FIG. 4B, the source driver 400 of the present embodiment is similar to that depicted in FIG. 1, and the main difference therebetween lies in that the source driver 400 further includes a ninth switch SW9 and a tenth switch SW10.

To be specific, the first terminal of the ninth switch SW9 is coupled to a first external voltage VML_EX, the second terminal of the ninth switch SW9 is coupled to the second power rail 140 and the second terminal of the third switch SW3, and the control terminal of the ninth switch SW9 is controlled by a fifth control signal CS5. The first terminal of the tenth switch SW10 is coupled to a second external voltage VMH_EX, the second terminal of the tenth switch SW10 is coupled to the first power rail 130 and the first terminal of the fifth switch SW5, and the control terminal of the tenth switch SW10 is controlled by the fifth control signal CS5.

In the present embodiment, the first external voltage VML_EX is an external reference voltage of negative polarity for the pre-charge operation. The second external voltage VMH_EX is an external reference voltage of positive polarity for the pre-charge operation. During the pre-charge period T3, the first switch SW1, the third switch SW3, the fourth switch SW4 and the fifth switch SW5 are not conducted, and the second switch SW2, the sixth switch SW6, the ninth switch SW9 and the tenth switch SW10 are conducted. The voltages at the output nodes N3 and N4 are respectively pre-charged to the second external voltage VMH_EX and the first external voltage VML_EX during the pre-charge period T3.

Figure 5A:
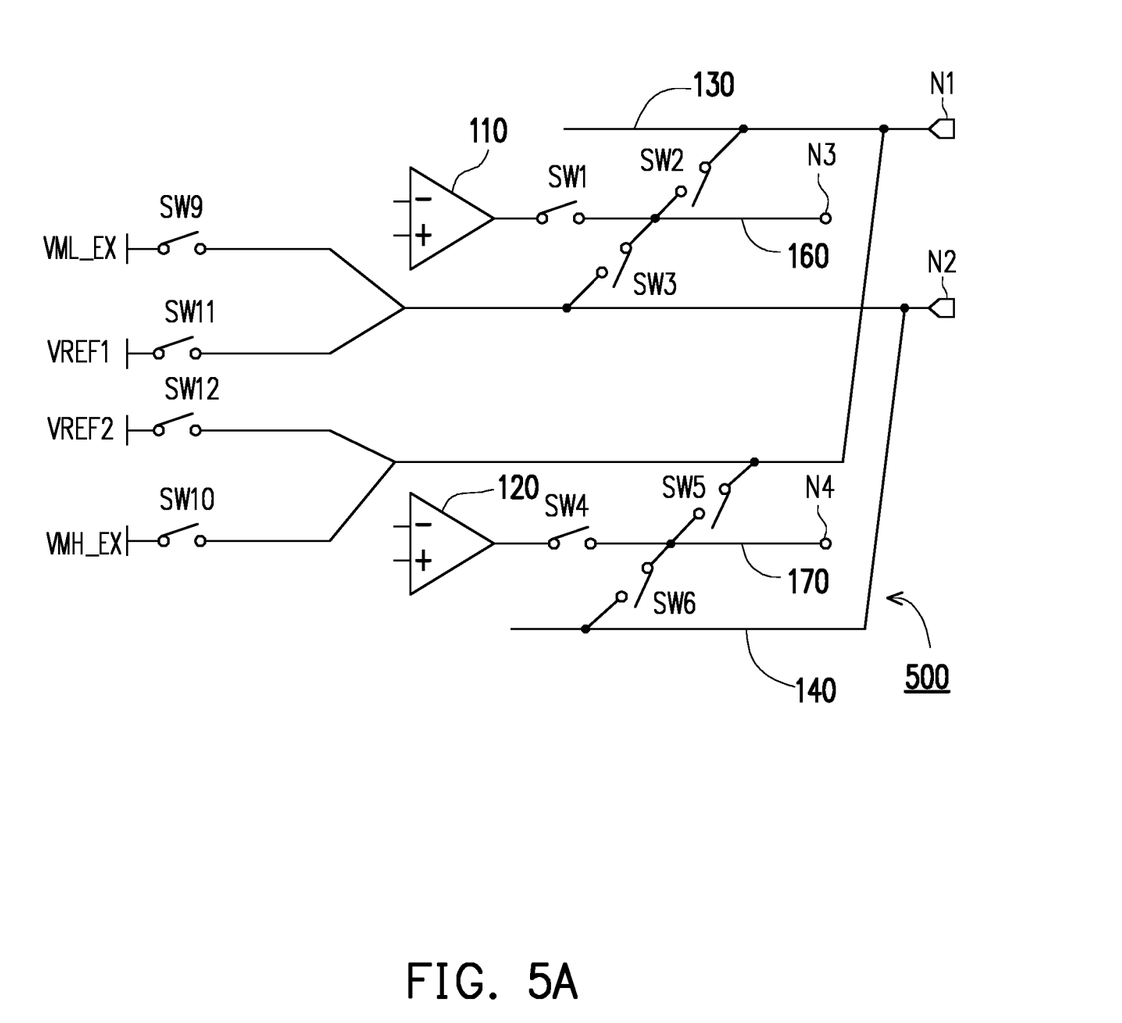
FIG. 5A is a schematic diagram illustrating a source driver according to another embodiment of the invention.
Figure 5B:
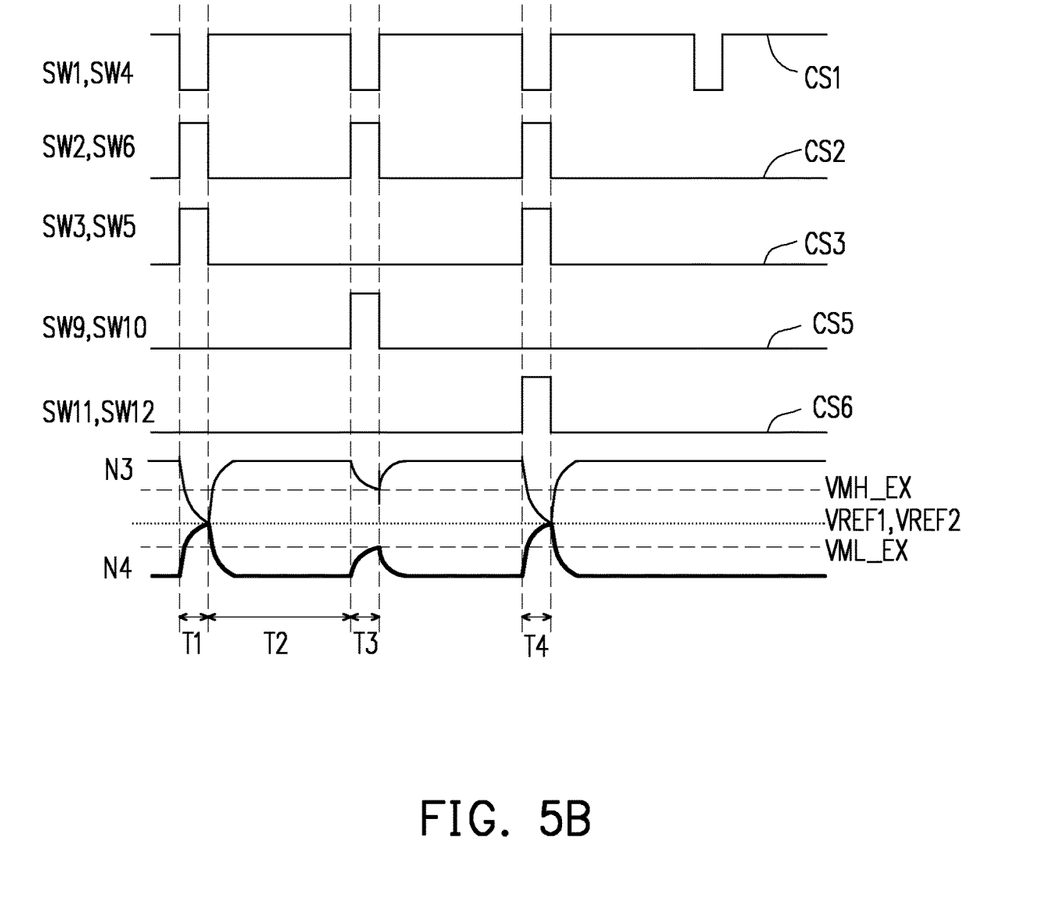
FIG. 5B is a waveform diagram illustrating control signals and driving voltages of the source driver depicted in FIG. 5A.

FIG. 5A is a schematic diagram illustrating a source driver according to another embodiment of the invention. FIG. 5B is a waveform diagram illustrating control signals and driving voltages of the source driver depicted in FIG. 5A. Referring to FIG. 4A, FIG. 5A and FIG. 5B, the source driver 500 of the present embodiment is similar to that depicted in FIG. 4A, and the main difference therebetween lies in that the source driver 500 further includes an eleventh switch SW11 and a twelfth switch SW12.

To be specific, the first terminal of the eleventh switch SW11 is coupled to the first reference voltage VREF1, the second terminal of the eleventh switch SW11 is coupled to the second power rail 140 and the second terminal of the third switch SW3, and the control terminal of the eleventh switch SW11 is controlled by a sixth control signal CS6. The first terminal of the twelfth switch SW12 is coupled to a second reference voltage VREF2, the second terminal of the twelfth switch SW12 is coupled to the first power rail 130 and the first terminal of the fifth switch SW5, and the control terminal of the twelfth switch SW12 is controlled by the sixth control signal CS6.

During the period T4, the first switch SW1, the fourth switch SW4, the ninth switch SW9 and the tenth switch SW10 are not conducted, and the second switch SW2, the third switch SW3, the fifth switch SW5, the sixth switch SW6, the eleventh switch SW11 and the twelfth switch SW12 are conducted. The voltages at the output nodes N3 and N4 are charged to the first reference voltage VREF1 and the second reference voltage VREF2 during the period T4.

Figure 6A:
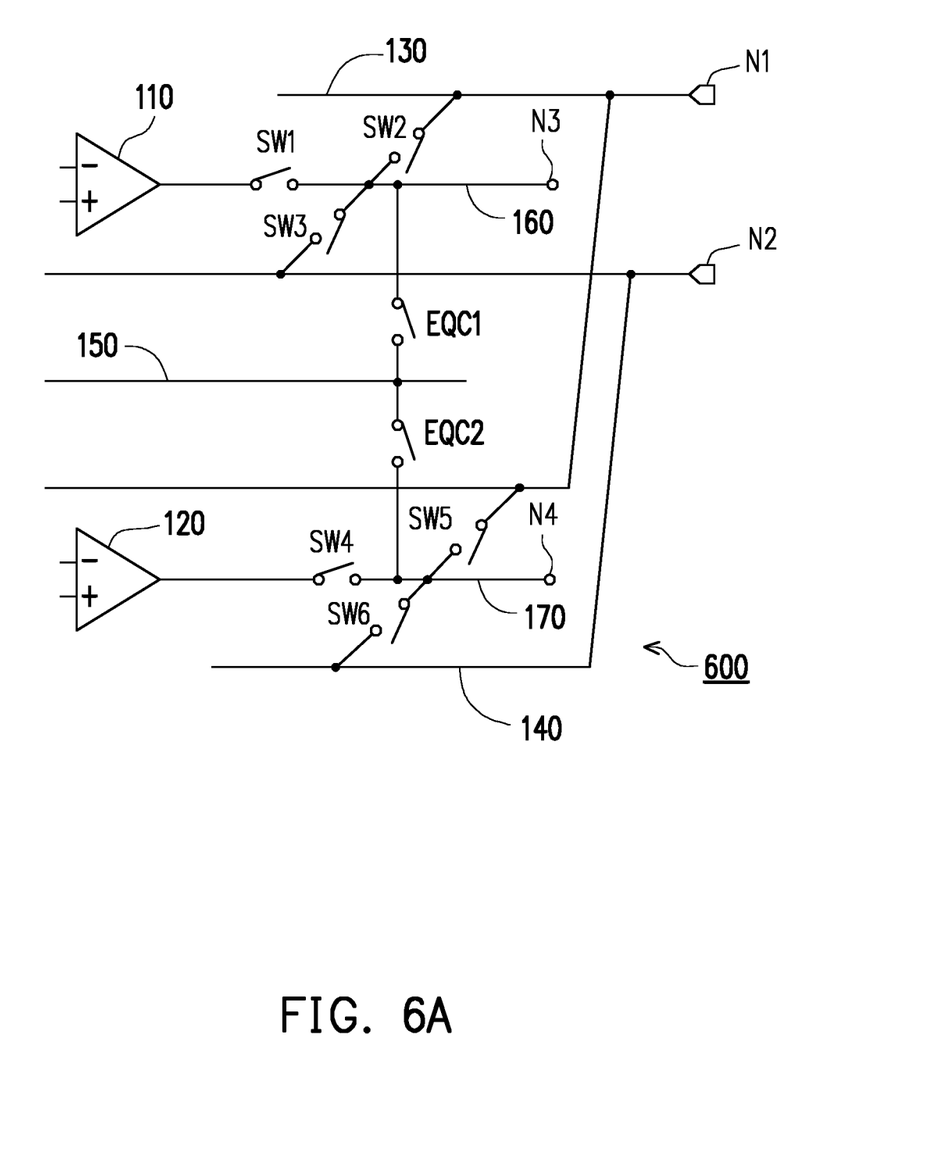
FIG. 6A is a schematic diagram illustrating a source driver according to another embodiment of the invention.
Figure 6B:
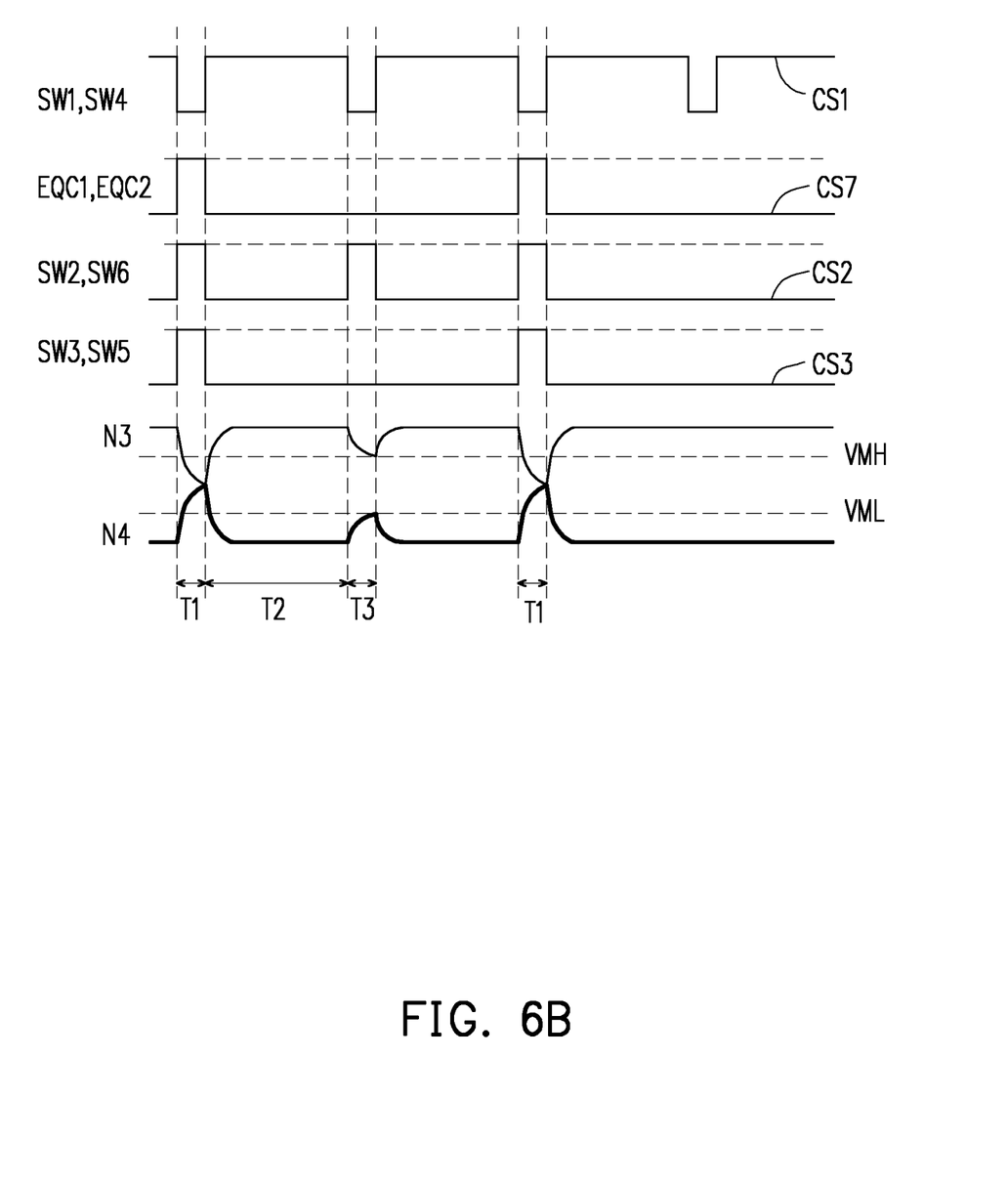
FIG. 6B is a waveform diagram illustrating control signals and driving voltages of the source driver depicted in FIG. 6A.

FIG. 6A is a schematic diagram illustrating a source driver according to another embodiment of the invention. FIG. 6B is a waveform diagram illustrating control signals and driving voltages of the source driver depicted in FIG. 6A. Referring to FIG. 1A, FIG. 6A and FIG. 6B, the source driver 600 of the present embodiment is similar to that depicted in FIG. 1A, and the main difference therebetween lies in that the source driver 600 further includes a charge-sharing line 150 and two switches EQC1 and EQC2.

In the present embodiment, the two switches EQC1 and EQC2 is controlled by a seventh control signal CS7. During the charge-sharing period T1, the first switch SW1 and the fourth switch SW4 are not conducted, and the second switch SW2, the third switch SW3, the fifth switch SW5, the sixth switch SW6 and the two switches EQC1 and EQC2 are conducted. The first power rail 130, the second power rail 140, the charge-sharing line 150 and the output lines 160 and 170 are connected together to perform the charge-sharing operation during the charge-sharing period T1.

In summary, a novel source driver is proposed in exemplary embodiments. The number of circuit elements and control signals for the charge-sharing operation is relatively less in the proposed source driver. Accordingly, the efficiency of the charge-sharing operation is improved and the chip area of the source driver is reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A source driver, comprising:
a first output buffer, comprising a first input terminal, a second input terminal and an output terminal;
a first switch, comprising a first terminal, a second terminal and a control terminal, wherein the first terminal of the first switch is directly connected to the output terminal of the first output buffer, the second terminal of the first switch is directly connected to a first output node of the source driver, and the control terminal of the first switch is controlled by a first control signal;

a second switch, comprising a first terminal, a second terminal and a control terminal, wherein the first terminal of the second switch is directly connected to a first node, the second terminal of the second switch is directly connected to the second terminal of the first switch, and the control terminal of the second switch is controlled by a second control signal;

a third switch, comprising a first terminal, a second terminal and a control terminal, wherein the first terminal of the third switch is directly connected to the second terminal of the first switch and the second terminal of the second switch, the second terminal of the third switch is directly connected to a second node which is different from the first node, and the control tell signal of the third switch is controlled by a third control signal;

a second output buffer, comprising a first input terminal, a second input terminal and an output terminal;

a fourth switch, comprising a first terminal, a second terminal and a control terminal, wherein the first terminal of the fourth switch is directly connected to the output terminal of the second output buffer, the second terminal of the fourth switch is directly connected to a second output node of the source driver;

a fifth switch, comprising a first terminal, a second terminal and a control terminal, wherein the first terminal of the fifth switch is directly connected to the first node, the second terminal of the fifth switch is directly connected to the second terminal of the fourth switch; and a sixth switch, comprising a first terminal, a second terminal and a control terminal, wherein the first terminal of the sixth switch is directly connected to the second terminal of the fourth switch and the second terminal of the fifth switch, the second terminal of the sixth switch is directly connected to the second node, wherein the source driver outputs driving voltages via the first output node and the second output node when the first switch and the fourth switch are conducted and the second switch, the third switch, the fifth switch and the sixth switch are not conducted.

2. The source driver as claimed in claim 1, wherein the first node and the second node are floating.

3. The source driver as claimed in claim 1, wherein the first node is coupled to a first capacitor, and the second node is coupled to a second capacitor.

4. The source driver as claimed in claim 3, further comprising:

a seventh switch, comprising a first terminal, a second terminal and a control terminal, wherein the second terminal of the seventh switch is coupled to the second node and the second terminal of the third switch; and an eighth switch, comprising a first terminal, a second terminal and a control terminal, wherein the second terminal of the eighth switch is coupled to the first node and the first terminal of the fifth switch.

5. The source driver as claimed in claim 1, further comprising:

a ninth switch, comprising a first terminal, a second terminal and a control terminal, wherein the first terminal of the ninth switch is coupled to a first external voltage, the second terminal of the ninth switch is coupled to the second node and the second terminal of the third switch; and a tenth switch, comprising a first terminal, a second terminal and a control terminal, wherein the first terminal of the tenth switch is coupled to a second external voltage, the second terminal of the tenth switch is coupled to the first node and the first terminal of the fifth switch.

6. The source driver as claimed in claim 5, further comprising:

an eleventh switch, comprising a first terminal, a second terminal and a control terminal, wherein the first terminal of the eleventh switch is coupled to a first reference voltage, the second terminal of the eleventh switch is coupled to the second node and the second terminal of the third switch; and a twelfth switch, comprising a first terminal, a second terminal and a control terminal, wherein the first terminal of the twelfth switch is coupled to a second reference voltage, the second terminal of the twelfth switch is coupled to the first node and the first terminal of the fifth switch.

7. The source driver as claimed in claim 1, further comprising:

a first power rail connected to the first node; and
a second power rail connected to the second node.

* * * * *